United States Patent
Bach

(10) Patent No.: US 7,100,582 B1
(45) Date of Patent: Sep. 5, 2006

(54) PROPANE INJECTION CONTROL SYSTEM AND APPARATUS FOR VEHICLES

(75) Inventor: Jeffrey R. Bach, Gurnee, IL (US)

(73) Assignee: Dynamic Fuel Systems, Inc., Gurnee, IL (US)

( * ) Notice: Subject to any disclaimer, the term of this patent is extended or adjusted under 35 U.S.C. 154(b) by 0 days.

(21) Appl. No.: 11/117,556

(22) Filed: Apr. 28, 2005

(51) Int. Cl.
*F02B 43/00* (2006.01)

(52) U.S. Cl. .............. 123/529; 123/525; 123/526; 123/528; 123/198 DB

(58) Field of Classification Search .............. 123/525, 123/526, 527, 528, 529, 676, 198 D, 198 DB
See application file for complete search history.

(56) References Cited

U.S. PATENT DOCUMENTS

| | | | | |
|---|---|---|---|---|
| 3,577,726 A | * | 5/1971 | Wagner | 123/528 |
| 4,078,531 A | * | 3/1978 | Hewitt | 123/198 DB |
| 4,471,742 A | * | 9/1984 | Kishi | 123/528 |
| 4,829,957 A | * | 5/1989 | Garretson et al. | 123/527 |
| 4,953,515 A | * | 9/1990 | Fehr et al. | 123/526 |
| 4,953,516 A | * | 9/1990 | van der Weide et al. | 123/527 |
| 5,203,305 A | * | 4/1993 | Porter et al. | 123/527 |
| 5,408,978 A | * | 4/1995 | Davis | 123/527 |
| 6,422,015 B1 | * | 7/2002 | Long | 123/526 |
| 2003/0097997 A1 | * | 5/2003 | Lynch et al. | 123/526 |

* cited by examiner

*Primary Examiner*—Erick Solis
(74) *Attorney, Agent, or Firm*—James J. Conlon

(57) ABSTRACT

A propane injector system for internal combustion engines for improving performance, fuel efficiency, safety, cleanliness and environmental friendliness. The system consists of introducing propane gas into "a black box" that has a pressure reducing valve to drop propane pressure as it flows initially from its storage tank and through an electronically controlled on/off valve. Propane enters an injector manifold where it is distributed to two specially designed gas handling fuel injectors that act as variable flow rate pumps controlled by a programmable microprocessor that is pre programmed for specific vehicles or can be customized with improved performance programming as determined by the vehicle owner. A pressure feedback system senses when the engine blower has caused a pressure boost on its high side feeding the cylinders. Transducers located in a Manifold Absolute Pressure (MAP) sensor detect the pressure boost and communicate with the microprocessor. This intake manifold pressure sensing provides feedback to the processor that controls the fuel injectors to customize the amount of propane being fed to the engine on an "as needed" basis. Information on engine performance is programmed into the computer controller, i.e. microprocessor, to provide the flow rates for the added propane. This arrangement maximizes fuel efficiency and minimizes propane use. A temperature sensor on the exhaust side monitors exhaust gasses and disables the system if excessive temperatures are experienced.

4 Claims, 2 Drawing Sheets

PROPANE INJECTION CONTROL SYSTEM AND APPARATUS FOR VEHICLES

BACKGROUND OF THE INVENTION (1) Field of the Invention

This disclosure pertains to a system or method and apparatus for controlling the injection of propane into a gas or diesel internal combustion engine.

(2) Description of the Prior Art

One attempt to provide a safe and effective propane injection system for an internal combustion engine is the Reggiani, U.S. Pat. No. 4,632,083 (1986) that shows a feedback and monitoring system for controlling the amount of propane injected into an internal combustion engine. Propane flow is determined by controlling pressures of propane to be injected into the fuel-air mixture and comparing intake manifold pressures to determine the flow of propane needed depending on the speed and load to maintain a predetermined fuel air ratio of 1.24. The Reggiani device is primarily concerned with maintaining a constant air-fuel ration during various engine speeds. There are no safety devices such as provided by the device and system disclosed herein and there is no programmable microprocessor to allow each unit to be pre programmed and customized as needed during use.

Other prior art devices used to inject propane into engines are of the type shown in the Fehr, U.S. Pat. No. 4,953,515 (1990) that shows a system for injecting propane into a diesel engine based on the turbo charger boost pressure. In other words, when the engine turbo-charger is activated to increase air flow to the engine, resultant pressure increase occurs in the intake manifold of the engine. A series of pressure sensors are coupled to the turbo-charger to monitor this boost pressure and are coupled to propane injectors that feed propane in steps to the primary air fuel mix as the boost pressure rises thereby admitting progressively increasing amounts of the secondary fued, propane, to the engine. While the structure and operation of the Fehr arrangement does monitor boost pressure to vary the amount of secondary fuel, each one of the monitoring or pressure switches must be individually set at a specific pressure level to open a propane injecting valve. There are no safety monitoring devices or shut offs to prevent damage to the engine as provided by the devices and system disclosed herein.

Another example of a propane injection system is shown in the Long, U.S. Pat. No. 6,422,015 (2002) that shows an attempt to overcome the drawbacks of the Fehr patent disclosure discussed above. Namely, Long shows a system that replaces the individual pressure sensing switches of Fehr with a diaphragm regulator valve that provides constant regulation of flow of the secondary fuel or propane rather than stepped flow shown in the Fehr patent. The Long patent also shows an on-off propane valve that is controlled with an electric switch to turn the system on and off from inside the vehicle. While this arrangement is different, it does not provide for adjustment or the safety features of this invention that includes an exhaust manifold temperature sensing probe to shut off the propane if engine temperatures rise to predetermined level. Further, this disclosure shows and driver accessible on off switch with a warning light for manual override if engine temperatures rise too high.

SUMMARY OF THE INVENTION

The nature of this invention is to provide a propane injector system for internal combustion engines for improving performance, fuel efficiency, safety, cleanliness and environmental friendliness. The system components consists of introducing propane gas into "a black box" that has a pressure reducing valve to drop propane pressure as it flows initially from its storage tank and through an electronically controlled on/off valve. Propane enters an injector manifold where it is distributed to two specially designed gas handling fuel injectors that act as variable flow rate pumps controlled by a programmable microprocessor that is pre programmed for specific vehicles or can be customized with improved performance programming as determined by the vehicle owner. A pressure feedback system senses when the engine blower has caused a pressure boost on its high side feeding the cylinders. Transducers located in a Manifold Absolute Pressure (MAP) sensor detect the pressure boost and communicate with the microprocessor. This intake manifold pressure sensing provides feedback to the processor that controls the fuel injectors to customize the amount of propane being fed to the engine on an "as needed" basis. Information on engine performance is programmed into the computer controller, i.e. microprocessor, to provide the flow rates for the added propane. This arrangement maximizes fuel efficiency and minimizes propane use.

The components can be provided in the form of a kit to be added to a vehicle to inject gaseous propane into the diesel fuel-air mixture. The propane-fuel-air mixture burns slower adding power without increasing price or exhaust products that are discharged into the environment. Further, it is possible with the system provided herein to allow diesel engines to idle at stop lights or other stops while operating almost exclusively on propane thus eliminating the undesirable diesel exhaust that is often found objectionable.

The novel choice and arrangement of the system components consists of introducing propane gas into "a black box" that has a pressure reducing valve to drop propane pressure as it flows initially from its storage tank and through an electronically controlled on/off valve. Propane pressure is dropped to a predetermined level that is programmed into the system depending on the engine to which the system is being attached. Next, propane enters an injector manifold where it is distributed to two specially designed gas handling fuel injectors that act as variable flow rate pumps controlled by a programmable microprocessor that senses when the engine blower has caused a pressure boost on its high side feeding the engine cylinders. Transducers located in a Manifold Absolute Pressure (MAP) sensor detect the pressure boost and communicate with the microprocessor. This intake manifold pressure sensing provides feedback to the processor that controls the fuel injectors to customize the amount of propane being fed to the engine on an "as needed" basis. This arrangement maximizes fuel efficiency and minimizes propane use.

A temperature sensor is located in the exhaust manifold and will shut down the propane system if temperatures exceed a predetermined level at which point engine damage can and will occur. The shut down occurs through the gas control valve that is shut off and through a control on the fuel injectors that de energizes each one if the system is to shut down.

The system has an in cab or dashboard mounted LED or other signal to alert the driver to dangerous exhaust temperatures even if the propane system is not in operation. An affiliated shut off switch allows the propane system to be disabled.

Another LED is provided to signal a system malfunction. This LED flashes with a frequency that tells the driver what is wrong with the system. The failures can range from problems with the propane injection system components, the engine blower, or other problems.

The kit form allows the conversion to be completed in a simple, time consuming and economical fashion. The propane injection occurs on the low pressure side of the blower by simply attaching a short pipe, with the propane line attached, to the flexible hose providing air to the blower. The next hookup is to attach the exhaust manifold temperature sensor by drilling and tapping into the manifold. The black box is attached inside the engine compartment or even in the drivers cab, the propane tank attached (permanent automotive type propane tank or a lift truck type cylinder can be use.

Next, a connection is made to the unit to communicate with a lap top computer that performs system diagnostics. After the engine is started the system is monitored with software that measures flow of propane, engine exhaust temperature and intake manifold pressure. The system is then monitored for performance during a range of engine operation. Once this data is loaded into a laptop other systems can be pre programmed to match the performance characteristics of the initial prototype or set up engine. If field tests determine that the engine and system can be improved, the system can be monitored during real time operating conditions to customize the settings on the system to optimize performance or operation to user specifications.

It is thus a purpose or object of the present invention to provide a propane injection system that includes flow control and monitoring devices connected to a programmable microprocessor that is pre set for specific engines to be easily added to vehicles and engines with a minimum of changes.

Another object of the invention is to provide a propane injection system for vehicles that includes an exhaust gas temperature sensor and automatic, safety shut off devices to prevent engine damage.

Another object of the invention is to provide a propane injection system for vehicles that includes an exhaust gas temperature sensor and visual indicators of lights and manual shut off devices to prevent engine damage.

It is another object of the invention to provide a propane injection system for vehicles that provides an inlet adapter ring with a propane injector attached thereto to be mounted to the low or inlet side of the air flow line adjacent the turbo charger for ease of installation.

It is yet another object of this invention to provide a propane injection system for vehicles that provides system monitoring with flashing lights that indicate various problems ranging from overheating to a clogged air filter.

It is another object of the invention to provide a method and process for improving the efficiency and performance of internal combustion engines by the steps of introducing a secondary fuel such as propane in a measures fashion by utilizing a microprocessor to control the system operation.

These and other objects of the invention will become apparent to those having ordinary skill in the art with reference to the following description, drawings and appended claims.

DESCRIPTION OF THE PREFERRED EMBODIMENTS

Figure 1:
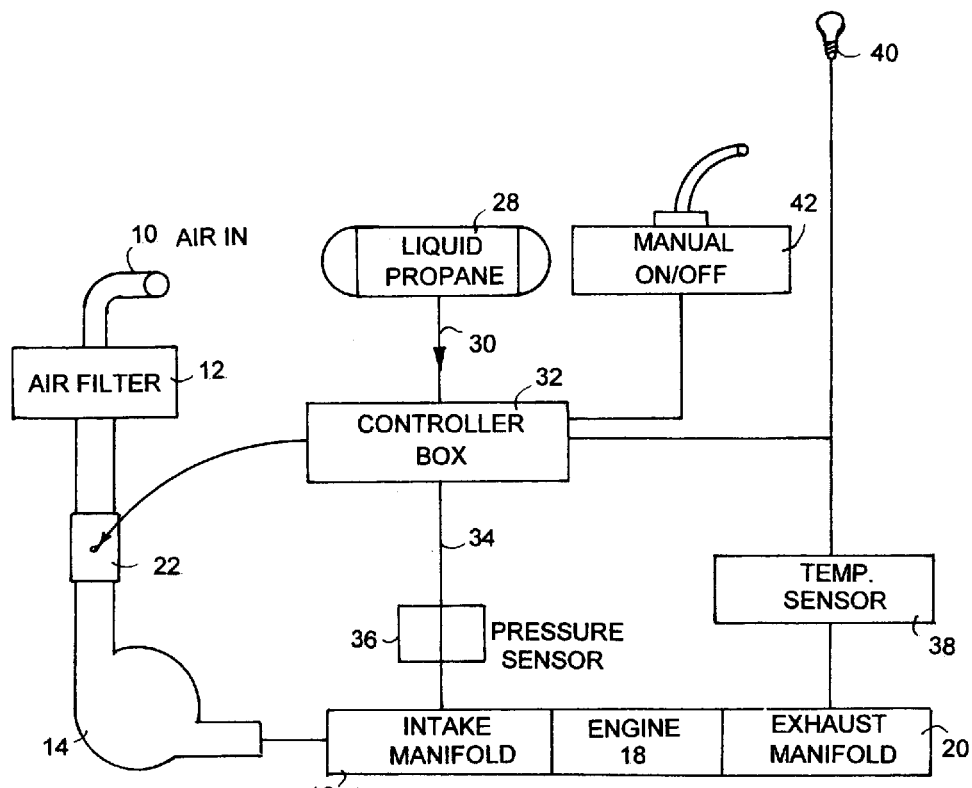
FIG. 1 is a schematic illustration of the components of the invention.

Referring now to the drawings and in particular FIG. 1 there is shown a generally schematic representation of the system of propane injection disclosed herein. A propane injector system for internal combustion engines improves performance, fuel efficiency, safety and cleanliness. Since the overall cost of fuel has rises significantly with the price of diesel equaling or even exceeding the price of gasoline, it is important that propane can be used to reduce fuel costs and eliminate some of the objections to burning pure diesel fuel such as the particulate and strong odor of the exhaust gasses. Further, with the injection of propane, a power boost is provided.

A typical diesel type of internal combustion engine has an air intake 10 and an associated air filter 12 to feed ambient air to a turbo charger 14 for increased air flow into an intake manifold 16 and ultimately to the engine designated by the numeral 18. Hot gasses from burned fuel and air are expelled from the engine through an exhaust manifold 20. This arrangement describes the customary arrangements of a diesel engine to which the propane injector of this disclosure is attached. While a diesel engine is used for the example, a gasoline engine could also be adapted for use of the propane injector system disclosed herein.

A primary feature of this disclosure is to show a combination of parts that are supplied in a kit form to be easily adapted and attached to an existing vehicle such as a truck, school bus, or even a stationary diesel such as used in providing power to a generator or pump. For example, in attaching the conversion kit to a truck, an adapter ring 22 is provided. This ring 22 is four inches in diameter and about five inches long. It contains a perforated fuel tube 24 that adds propane to the air stream before it goes through the turbo charger 14 and into the engine 18. Adapter ring 22 has two ridges 26 that fit under hoses and provide convenient attachment points for mounting the adapter 22 onto the vehicle. A propane tank 28 is mounted on the vehicle in a location where it can be easily accessed for filling.

As shown in FIG. 1, a propane line 30 extends from the tank 28 to a control box 32. A pressure line 32 is attached to a pressure sensor 36 to monitor pressure in the intake manifold to feed propane when the turbo charger 14 increases pressure as the engine 18 speeds up or the load on the engine 18 increases. A temperature sensor 38 is located in the exhaust manifold to monitor exhaust temperatures as a safety feature and shut off the system if temperatures exceed a pre set level. A light 40 located for easy viewing by a driver or operator is also connected to the temperature sensor 38 to visually indicate when a predetermined temperature is reached even before the system shuts down automatically. A shut off switch 42 is located to be easily reached to manually shut off the system if the light 40 indicated a problem.

Propane flows through line 30 and into the control box 30 where a pressure reducing valve 43 is located to reduce propane pressure to a level it can be fed into fuel injectors 44 and ultimately into the engine 18.

Figure 2:
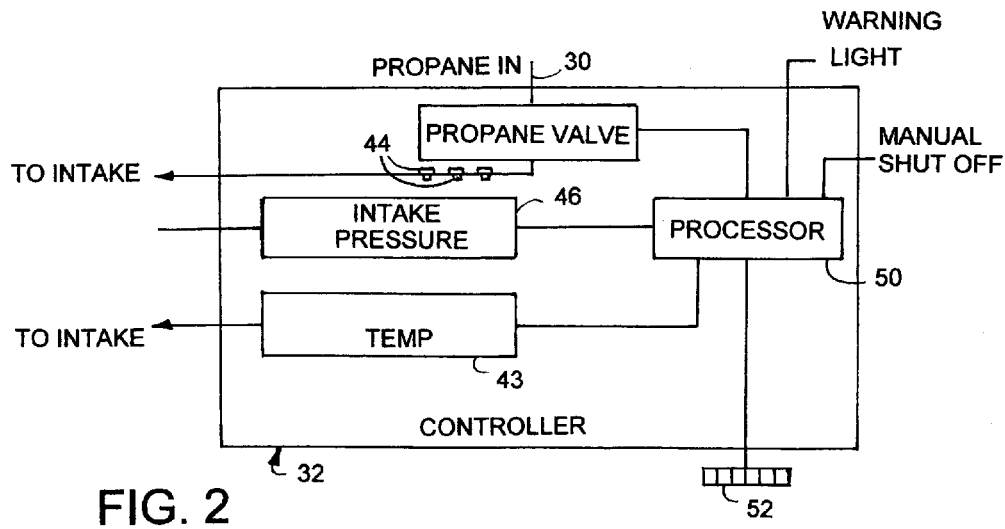
FIG. 2 is a block diagram of the controller or black box of the invention.
Figure 3:
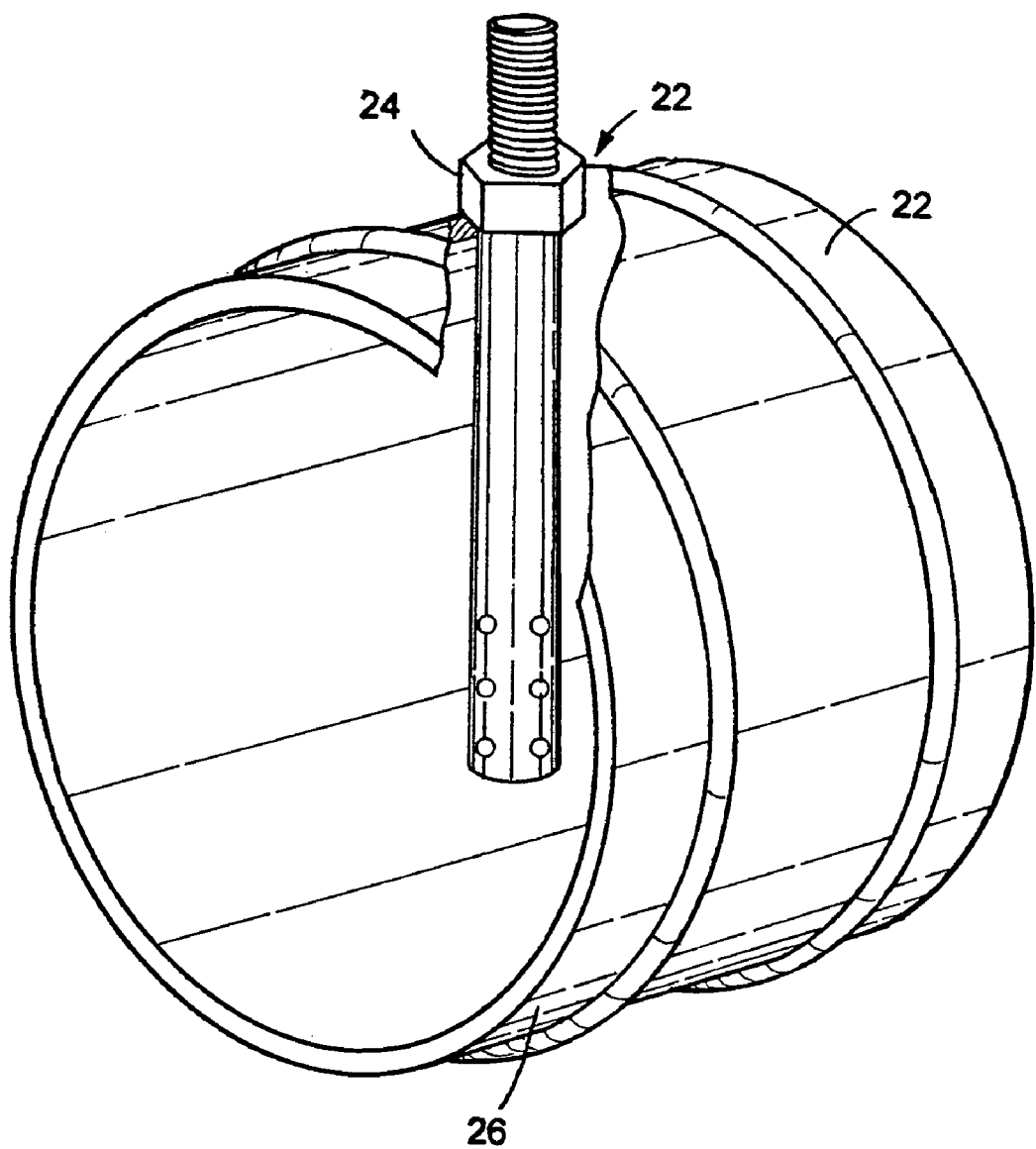
FIG. 3 is a perspective illustration of the adapter ring and attached fuel tube.

Referring now to FIG. 2 for an explanation of the operation of the system and the controls that are provided. The control or black box is show by the number 32. This box is a rugged member that contains the reducing valve 43, fuel injectors 44 and a microprocessor 50. All feed back temperature and pressure sensing lines are located in the control box 32 and provided data to the microprocessor that is evaluated and acted upon based on programming limits as determined by each vehicle. As an example information will be programmed into the microprocessor based on test data obtained from actual tests on vehicles. If a common type of school bus with a standard engine is evaluated the data is stored and used to program other kits that will be installed in the same bus with the same engine. Since the kit provides an adaptor or common connector for connecting to a laptop computer for programming and evaluation, the field work is performed quickly, reliably and without dismantling the fuel system. The system operates on standard 12 V DC.

The forgoing description and drawings merely explain and illustrate the invention and the invention is not limited thereto, except insofar as the appended claims are so limited, as those who are skilled in the art and have the disclosure before them will be able to make modifications and variations therein without departing from the scope of the invention.

PARTS LIST

Pane Injection Control System and Apparatus for Vehicles
10 air intake
12 air filter
14 turbo charger
16 intake manifold
18 engine
20 exhaust manifold
22 adapter ring
24 fuel tube injector
26 ridges for attaching ring
28 propane tank
30 propane line
32 control box
34 pressure line
36 pressure sensor
38 temperature sensor
40 light
42 manual on/off
42 pressure reducing valve
44 injectors/solenoids
46 intake pressure
48 exhaust temperature
50 microprocessor—programmable
52 adapter/connector for laptop

What I claim as my invention is:

1. A supplemental fuel injection system for internal combustion engines, said injection system including:
   a supplemental fuel supply tank containing said fuel;
   an air compressor means such as a turbocharger to increase the flow of air to said engine and having an inlet and an outlet;
   pressure monitoring means in an air outlet side of said compressor means to monitor air pressure leaving said air compressor means;
   temperature sensing means located at an exhaust section of said engine to monitor temperature of engine exhaust gasses;
   a mounting ring providing a rigid cylindrical member with means positioned adjacent said air compressor inlet and having a supplemental fuel injector with feed lines connected with said supplemental fuel into the air stream entering said air compressor;
   control means having supplemental fuel supply pumps, i.e. solenoid activaged injectors;
   said control means having a programmable microprocessor connected with said injectors to vary the flow of supplemental fuel on an as needed, customized and pre programmed basis for said engine.

2. The supplemental fuel injection system of claim 1, wherein said microprocessor has first electrical means connected with said pressure sensing means on the intake manifold side of said engine, and, second electrical means connected with said temperature sensing means located on the exhaust side of said engine, said microprocessor being programmed to shut down said flow of supplemental fuel at a predetermined and undesirable temperature on the exhaust or pressure in the intake side of said engine.

3. The supplemental fuel system of claim 1, and further including:
   visual indicia means such as a light with means connected with said microprocessor to be activated as a warning device when pressure or temperature in the system is approaching an undesirable level that could result in damage to said engine;
   manual override switch means with electrical means connected to said system to deactivate the system on an as needed basis as indicated by the temperature and pressure sensing devices and as analyzed by said microprocessor.

4. A kit for adding a propane injection system to an internal combustion engine having the usual intake and exhaust manifolds and having an inlet air pressure booster such as a turbocharger to increase air flow and pressure of air fed into the intake manifold of said engine and comprising:
   a black box controller with valve step down pressure means; and having propane injectors to feed propane to said engine;
   temperature sensing means for measuring the temperature of said exhaust gasses;
   pressure sensing means for positioning to measure boost pressure provided by said turbocharger;
   programmable microprocessor to control the flow of said propane and having means programmable for said engine to measure the correct amount of propane to be fed into said engine for improved engine performance and efficiency;
   said black box having electrical connection means for connection of external testing, monitoring and adjusting means to monitor operation of the system.

* * * * *